United States Patent
Seita et al.

(10) Patent No.: US 7,947,194 B2
(45) Date of Patent: May 24, 2011

(54) ANTISKID SNOW-CLEARING COMPOSITION

(76) Inventors: Victor Seita, Dammartin sur Tigeaux (FR); Roger Sicot, Paris (FR); Yann Denolle, Neuilly sur Seine (FR)

( * ) Notice: Subject to any disclaimer, the term of this patent is extended or adjusted under 35 U.S.C. 154(b) by 0 days.

(21) Appl. No.: 12/515,215

(22) PCT Filed: Nov. 16, 2007

(86) PCT No.: PCT/EP2007/062469
§ 371 (c)(1),
(2), (4) Date: Jul. 24, 2009

(87) PCT Pub. No.: WO2008/059057
PCT Pub. Date: May 22, 2008

(65) Prior Publication Data
US 2010/0044622 A1    Feb. 25, 2010

(30) Foreign Application Priority Data

Nov. 17, 2006 (FR) ...................... 06 10066

(51) Int. Cl.
*C09K 3/18* (2006.01)
*B05D 5/06* (2006.01)
*B05D 1/00* (2006.01)

(52) U.S. Cl. ............. 252/70; 106/13; 427/215; 427/220

(58) Field of Classification Search ............ 106/13; 252/70; 427/215, 220
See application file for complete search history.

(56) References Cited

U.S. PATENT DOCUMENTS

| | | | |
|---|---|---|---|
| 5,296,167 A * | 3/1994 | Murray | 252/387 |
| 5,531,931 A * | 7/1996 | Koefod | 252/387 |
| 6,440,325 B1 * | 8/2002 | Hartley et al. | 252/70 |

FOREIGN PATENT DOCUMENTS

| | | |
|---|---|---|
| DE | 3141644 A1 | 5/1983 |
| JP | 60-195178 A1 | 10/1985 |
| JP | 60-202182 A1 | 10/1985 |

OTHER PUBLICATIONS

Derwent-Acc-No. 1983-44378K, abstract of German Patent Specification No. DE3141644A (May 1983).*
International Search Report, [mail date of Feb. 12, 2008].

* cited by examiner

*Primary Examiner* — Anthony J Green
(74) *Attorney, Agent, or Firm* — Pepper Hamilton LLP

(57) ABSTRACT

The invention relates to a powdery snow-clearing, de-icing and antiskid composition, characterised in that it comprises a mixture of calcium salts containing from 70 to 90 wt % of calcium chloride and from 10 to 30 wt % of calcium carbonate. The invention also relates to a method for producing the same and to the use thereof as a snow-clearing agent.

17 Claims, 1 Drawing Sheet

ANTISKID SNOW-CLEARING COMPOSITION

Figure 1:
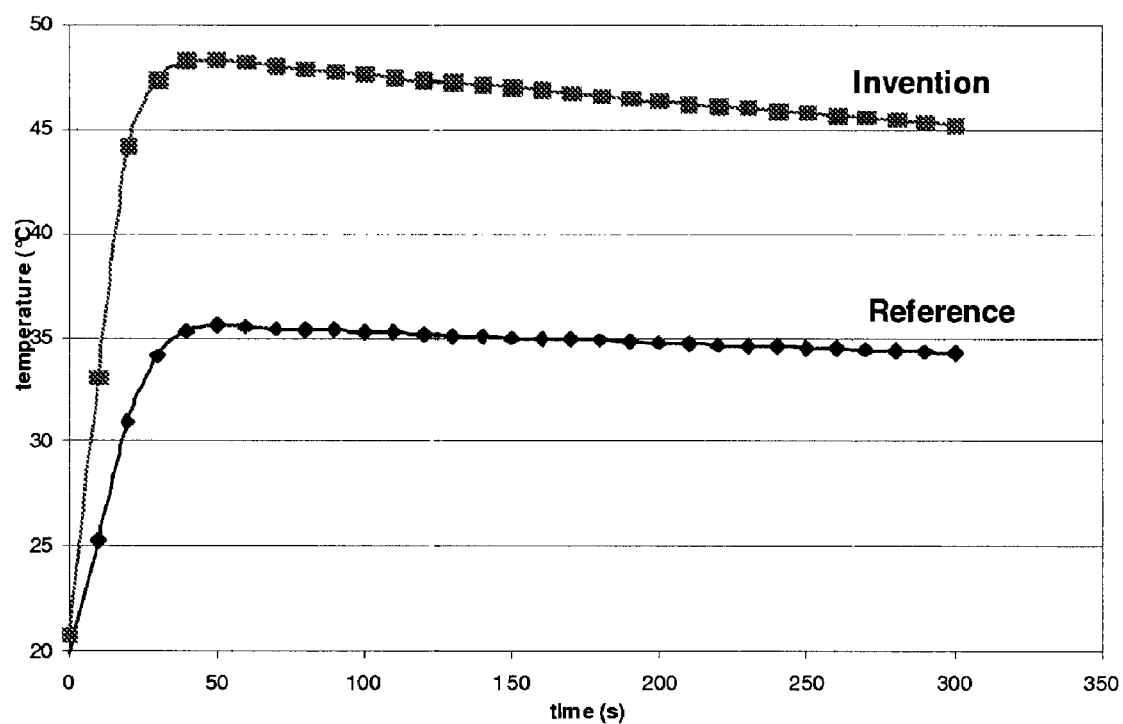

This application is the U.S. National Stage filing under 35 U.S.C. §371 of International Application Serial No. PCT/EP2007/062469 filed Nov. 16, 2007, which claims priority under 35 U.S.C. §119(a) to French Application Serial No. 06/10066 filed Nov. 17, 2006, each of which is incorporated herein by reference in its entirety.

The present invention relates to powdery snow-clearing and de-icing compositions with antiskid properties. As used herein this expression relates to compositions capable of melting ice, snow or more generally water in solid form present on various surfaces, such as for example roads, bridges, surfaces of squares and sidewalks, while leaving an antiskid agent on such surface.

As used herein, the term powdery relates to a dry powder having an average diameter of between 0.6 and 8 mm that can be spread by any spraying means.

The most frequently used snow-clearing agent is currently sodium chloride, mainly because of its low cost. Sodium chloride lowers the melting point of the water in which it is dissolved down to −21° C. under well controlled laboratory conditions. However on roads, NaCl does not melt the ice if temperatures are below −9° C. Also, the amounts of salt that should be sprayed to achieve this result are very large and result in major disadvantages.

The main problem lies in the dispersion in the environment of large amounts of chloride ions. These are held responsible for the inhibition of water absorption by tree and plant roots. Thus chlorides are infiltrated in the leaves, with become brown from the edges inwards and fall early. When exposed to rain and melted snow, chlorides present in the fallen leaves are washed and redissolved, then a new cycle begins. Thus, chlorides build up in the soil.

As regards sodium ions, as they build up they tend to block the earth and promotes soil compaction into layers.

Another disadvantageous aspect relating to the use of sodium chloride is its corrosive effect on metal surfaces, mainly on iron or aluminum alloys. It promotes redox reactions responsible for metal degradation by promoting electron exchanges.

Many chemical compositions have been investigated for replacing sodium chloride, but none has been fully satisfying, either because of their high cost, their harmful impact on environment, or because they deteriorate the treated surfaces.

Ammonium salts, which act as a defrosting agent, etch concrete, mortar, and materials containing calcium. Sulfates tend to react with the tricalcium aluminate in cement and produce cracks and splits.

Organic antifreezes are less aggressive for surfaces but are a lot more expensive than inorganic agents, and they are not often an economically viable solution. These are additional environmental problems, as these are also less biodegradable. Glycols for example, which are in liquid form, are resistant to degradation, and bring long-term contamination to water basins.

Thus there is still a need today for an antifreeze or anti-snow agent which is efficient under extreme conditions, and which reduces the amounts of salts spread in the environment.

Accordingly the present invention provides a simple and economically acceptable, essentially inorganic composition, having a defrosting ability much higher than that of sodium chloride, thus allowing it to be used in sufficiently low amounts to limit significantly its impact on the environment.

More specifically, the present invention relates to a snow-clearing, de-icing and antiskid, powdery composition characterized in that it comprises a mixture of calcium salts including, on a weight basis, 70 to 90% of calcium chloride and 10 to 30% of calcium carbonate.

FIG. 1 shows action of a representative de-icing agent.

Such a composition can provide protection temperatures of almost −50° C., that is to say, when it is on the surface of a road that is being cooled down, it can delay the onset of the first ice crystals down to about −50° C.

This surprising effect results from the choice of calcium chloride and from its combined use in two different forms.

Calcium chloride provides a dual advantage compared to sodium chloride. On the one hand, its impact on lowering the melting point of water is much higher. In fact, the reduction of the melting point by dissolution of salts is referred to as a colligative property, i.e. it depends on the number of solute particles present. Thus, calcium chloride, which dissociates into three ions (one calcium and two chlorides) lowers the melting point of water more than sodium chloride which only gives two ions.

Also, whereas the dissolution of sodium chloride is an endothermal phenomenon, going against the desired aim, the dissolution of calcium chloride is highly exothermal, thus contributing to the melting of the snow or ice.

Calcium chloride is advantageously present in the composition according to the invention in the form of flakes and in the form of beads.

Beads are small spheres having a very high content of calcium chloride, advantageously higher than 90% by weight, even more advantageously between 94 and 97% by weight.

The flakes contain about 77% by weight of calcium chloride as well as manufacturing residues such as alkaline and magnesium salts, and lime and residual water.

The beads have a heat of dissolution which is higher than the flakes (679 kJ/mol versus 302 kJ/mol) and are accordingly more efficient. However, one reason precludes the sole use of beads in the composition of the invention: spraying spherical solid particles on already slippery surfaces would have an adverse effect to the one sought after, and would not contribute to make said surfaces safer.

Accordingly the authors of the present invention developed an optimal composition, in which the flakes mixed with the beads mechanically offset the rolling effects that could be caused by the latter.

Advantageously, the ratio between the weight amount of the calcium chloride in the form of beads and the weight amount of the calcium chloride in the form of flakes is between 0.5 and 1.5, and even more advantageously higher than 1.

Advantageously, the mixture of calcium salts contains on a weight basis about 80% of calcium chloride and about 20% of calcium carbonate.

Calcium carbonate functions as an antiskid agent. It is water-insoluble, and it increases adhesion to treated surfaces and lowers the risks of sliding, making-up a layer of coarse solid particles that remain when the chlorides are dissolved and the snow or ice are melted.

Its use also prevents problems due to the use of sand, which adheres to the pedestrians' shoes and then damages wooden and tiled floors when they walk back home. Calcium carbonate is a solid softer than sand which splats under the load of the steps. It thus remains harmless for interior floors, but also for surfaces of squares and fragile exterior surfaces such as marbles.

Calcium carbonate is advantageously present in the composition according to the invention in the form of grains having at least two different particle size profiles, and in particular belonging to separate size ranges.

As used herein the term particle size profile refers to the numeration of particles based on their size.

Advantageously, 50% of calcium carbonate has an average particle size of approximately 1.1 mm and 50% has an average particle size of approximately 1.8 mm.

Thus, grains having the highest size are particularly suitable for pavements for motor vehicles, cycles and motorcycles as well as for pedestrians equipped with shoes having soles with wide grooves.

Grains having a lower size contribute to make the traffic safer for pedestrians wearing town shoes such as high-heel shoes.

The composition according to the invention can further contain a colored spraying indicator.

This indicator allows the eye to spot directly the areas that have already been treated and thus avoid using excess salts.

The colored spraying indicator is advantageously attached by adsorption on at least a part of the calcium chloride. It is thus removed by rinsing with the water resulting from the melting of the snow or ice.

Advantageously, the amount of spraying indicator represents on a weight basis less than 0.1% based on the total weight, and preferably 0.01%.

The spraying indicator is advantageously a food color that can be selected from the group of Exxx colors, and is preferably E102, E104, E110, or E131.

The composition according to the invention can also contain other additives such as for example an anti-congealing agent.

As used herein the term anti-congealing agent refers to any agent functioning to prevent re-caking, in solid form, of the water melted by the use of the composition according to the invention.

The anti-congealing agent can be selected from organic and mineral compounds and salts, and is advantageously sodium chloride or urea.

Advantageously, the amount of urea represents on a weight basis from 2 to 10% based on the total weight, and preferably 4%.

Because its cost is higher than that of NaCl, the composition according to the invention is not designed to replace the latter on most roads and highways where large amounts of snow-clearing agent are to be sprayed, but it will rather find applications in an urban environment or on particularly dangerous road sections. These include as an example exits in front of schools, hospitals, churches, or public buildings, squares, sidewalks, surfaces of squares in front of buildings, pedestrian areas, cycle lanes, access paths to houses and buildings, outside stairs, bridges, car parks, but also runways in airports. Typical areas where traffic is difficult in cold weather and where the invention can also be applied include as an example slip roads to and from highways, highway junctions, roundabouts, sloping roads, mountain roads and passes, urban areas and areas where speed is limited to 30 km/h.

The invention also relates to the use of a composition as described above for causing snow, ice, or any other form of solid water to melt.

The invention therefore further relates to the use of a composition as described above as a snow-clearing or de-icing agent.

The invention also relates to a process for preparing a composition as described above and comprising a colored spraying indicator, characterized in that it comprises the following sequential steps:

introducing into a blade or screw mixer, or any other equivalent mixer, a fraction of the total amount of calcium chloride, and the spraying indicator;

mixing slowly until the spraying indicator is uniformly distributed on the calcium chloride without breaking the calcium chloride flakes;

adding the remaining fraction of calcium chloride together with the calcium carbonate and any other optional ingredients;

mixing until a uniform solid mixture is obtained.

Advantageously, the first fraction of calcium chloride, with which the indicator will be mixed, represents ⅛ of the total fraction.

It is particularly important to distribute the colored indicator uniformly on the calcium chloride, to provide the final user with a reliable indication of the amount of snow-clearing composition present on the surface.

The invention is illustrated by, but not limited to, the following example.

EXAMPLE

The heat of dissolution in water of a composition according to the invention was compared with that of simple calcium chloride flakes.

Materials:

The reference material is $CaCl_2$ in flaky form "Calcium chloride 77/80%" from the company Quaron.

The product tested is a composition according to the invention containing on a weight basis:

34.99% of $CaCl_2$ in flaky form "Calcium chloride 77/80%" from the company Quaron.

45% of $CaCl_2$ in bead form "Calcium Chloride Prills 94-97%" from the company Nedmag 10% of $CaCO_3$ Ø 1.1 mm "Granicalcium" from the company Omya 10% of $CaCO_3$ Ø 1.8 mm "Granicalcium" from the company Omya 0.01% of "Mint Green C" color from the company Sensient LCW, adsorbed on 1:8 of $CaCl_2$.

Experimental Method:

30 g of the two de-icing agents mentioned above were mixed separately in 100 g of water at precisely 20° C. The mixtures were each placed under magnetic stirring, at about 300 rpm, in a beaker isolated with a polystyrene envelope, in order to limit thermal exchanges. The increase in temperature in both mixtures, due to the exothermal dissolution reaction of the de-icing agent, was followed by measuring the temperature at 10 second intervals and plotted versus time to yield the curves shown in FIG. 1.

Compared with a conventional standard de-icing agent, the test shows that the increase in temperature due to the exothermal dissolution reaction of calcium chloride is twice as large for the de-icing agent according to the invention. The composition according to the invention therefore significantly accelerates the melting of the ice and snow compared to a conventional de-icing agent.

The invention claimed is:

1. A snow-clearing, de-icing and antiskid powdery composition, comprising a mixture of calcium salts containing, on a weight basis, 70 to 90% of calcium chloride and 10 to 30% of calcium carbonate, wherein calcium chloride is in the form of flakes and in the form of beads.

2. The composition according to claim 1, wherein the mixture of calcium salts contains by weight about 80% of calcium chloride and about 20% of calcium carbonate.

3. The composition according to claim 1, wherein the ratio between the weight amount of the calcium chloride in the form of beads and the weight amount of the calcium chloride in the form of flakes is between 0.5 and 1.5.

4. The composition according to claim 3, wherein the ratio between the weight amount of the calcium chloride in the form of beads and the weight amount of the calcium chloride in the form of flakes is higher than 1.

5. The composition according to claim 1, wherein the calcium carbonate is in the form of grains of at least two different particle size profiles.

6. The composition according to claim 5, wherein 50% of the calcium carbonate has an average particle size of approximately 1.1 mm and 50% has an average particle size of approximately 1.8 mm.

7. The composition according to claim 1, further comprising a colored spraying indicator.

8. The composition according to claim 7, wherein the amount of the colored spraying indicator represents on a weight basis 0.01% based on the total weight.

9. The composition according to claim 7, wherein the colored spraying indicator is a food color.

10. The composition according to claim 9 wherein the food color is E102, E104, E110, or E131.

11. The composition according to claim 7 wherein the colored spraying indicator is absorbed on at least a part of the calcium chloride.

12. The composition according to claim 1, further comprising an anti-congealing agent.

13. The composition according to claim 12, wherein the anti-congealing agent is selected from organic and mineral compounds and salts.

14. The composition according to claim 13, wherein the anti-congealing agent is urea and is present in an amount, on a weight basis, of 4% based on the total weight.

15. The composition according to claim 13 wherein the anti-congealing agent is sodium chloride or urea.

16. A method for causing the snow, ice or any other form of solid water present on a surface to melt comprising contacting said surface with a composition according to claim 1.

17. A process for preparing a composition according to claim 1 further comprising a spraying indicator, comprising the following sequential steps:
   introducing into a blade or screw mixer, or any other equivalent mixer, a fraction of calcium chloride, and the spraying indicator;
   mixing slowly until the spraying indicator is uniformly distributed on the calcium chloride without breaking the calcium chloride flakes;
   adding the remaining fraction of calcium chloride together with the calcium carbonate; and
   mixing until a uniform solid mixture is obtained.

* * * * *